US007997780B2

(12) United States Patent
Chang (10) Patent No.: US 7,997,780 B2
(45) Date of Patent: Aug. 16, 2011

(54) LIGHTING DEVICE

(75) Inventor: Shao-Han Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 327 days.

(21) Appl. No.: 12/353,412

(22) Filed: Jan. 14, 2009

(65) Prior Publication Data

US 2010/0033952 A1    Feb. 11, 2010

(30) Foreign Application Priority Data

Aug. 6, 2008   (CN) .......................... 2008 1 0303555
Oct. 10, 2008  (CN) .......................... 2008 1 0304861

(51) Int. Cl.
*F21V 7/04* (2006.01)

(52) U.S. Cl. ........ 362/555; 362/612; 362/618; 362/620; 362/621; 362/622

(58) Field of Classification Search .................. 362/555, 362/612, 618, 620, 621, 622
See application file for complete search history.

(56) References Cited

U.S. PATENT DOCUMENTS

| 7,408,708 | B2 * | 8/2008 | Goto et al. ..................... 359/456 |
| 7,726,865 | B2 * | 6/2010 | Sato et al. ..................... 362/620 |
| 7,742,137 | B2 * | 6/2010 | Adachi et al. ................. 349/122 |
| 7,804,649 | B2 * | 9/2010 | Eckhardt et al. .............. 359/619 |
| 7,806,567 | B2 * | 10/2010 | Chen ........................ 362/311.06 |
| 2006/0002678 | A1 * | 1/2006 | Weber et al. .................. 385/146 |
| 2006/0236877 | A1 * | 10/2006 | Strand et al. ...................... 101/6 |
| 2007/0086179 | A1 * | 4/2007 | Chen et al. ...................... 362/27 |

* cited by examiner

*Primary Examiner* — James Lee
*Assistant Examiner* — Mark Tsidulko
(74) *Attorney, Agent, or Firm* — Altis Law Group, Inc.

(57) ABSTRACT

A lighting device includes a housing, a plurality of LEDs arranged on a base of the housing, and a first optical plate positioned above the LEDs. The first optical plate includes a light input surface, a light output surface opposite to the light input surface, and a plurality of elongated arcuate protrusions formed on the light output surface. The elongated arcuate protrusions are substantially parallel to one another. The lighting device may be used as a backlight module.

15 Claims, 10 Drawing Sheets

LIGHTING DEVICE

CROSS REFERENCE STATEMENT

This application is related to co-pending U.S. patent applications, which are Ser. Nos. 12/317,396, 12/319,010, 12/318,043, 12/319,009, and all entitled "OPTICAL PLATE AND BACKLIGHT MODULE USING THE SAME," and application Ser. No. 12/319,040, entitled "LIGHTING DEVICE". In the co-pending applications, the inventor is Shao-Han Chang. The co-pending applications have the same assignee as the present application.

BACKGROUND

1. Technical Field

The present invention generally relates to lighting devices and, more particularly, to a lighting device using light emitting diodes.

2. Discussion of the Related Art

Light emitting diodes (LEDs) are preferred over other types of light sources because LEDs exhibit low energy consumption, long service life, and other advantages. Therefore, LEDs are widely used as light sources.

Typically, a lighting device using LEDs includes a housing and a plurality of LEDs arranged on a base of the housing. In use, light rays emitted from different LEDs of the lighting device illuminate an object, thereby creating a lot of shadows of the object. Thus, a lighting quality is reduced.

Therefore, a new lighting device is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION OF THE EMBODIMENTS

Figure 1:
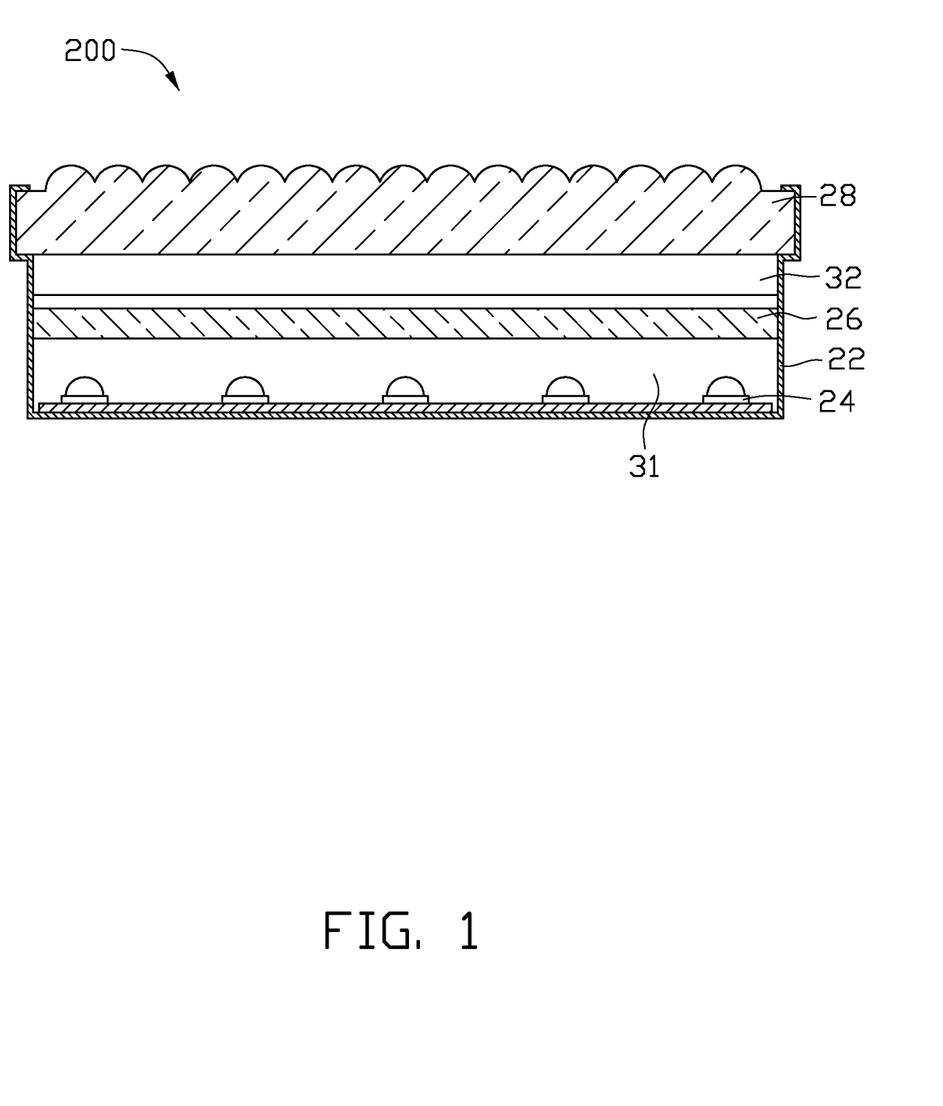
FIG. 1 is a side cross-sectional view of one embodiment of a lighting device, the lighting device including a first embodiment of a first optical plate.

Referring to FIG. 1, one embodiment of a lighting device 200 includes a housing 22, a plurality of LEDs 24 arranged on a base of the housing 22, a first optical plate 26, and a second optical plate 28. The first optical plate 26 is positioned above the LEDs 24 and the second optical plate 28 is positioned above the first optical plate 26. The first optical plate 26 is spaced from the base of the housing 22 at a predetermined distance. The first optical plate 26 and the housing 22 cooperatively define a first light-mixing space 31. The second optical plate 28 is spaced from the base of the first optical plate 26 at a predetermined distance, so that a second light-mixing space 32 is defined between the first optical plate 26 and the second optical plate 28.

In one embodiment, the housing 22 is made of metal or plastic materials with high reflectivity. In another embodiment, an interior surface of the housing 22 may be coated with a high reflectivity coating for improving light reflectivity rate.

Figure 2:
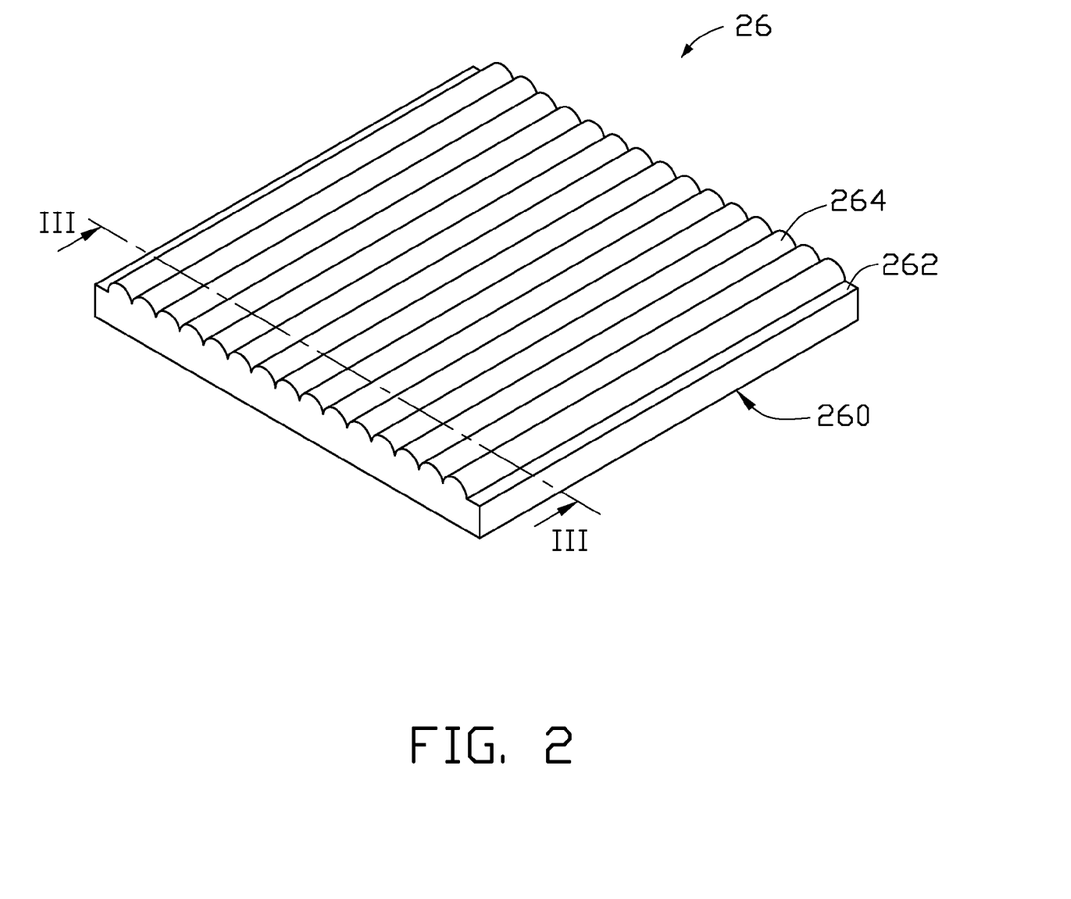
FIG. 2 is an isometric view of the first optical plate in FIG. 1.
Figure 3:
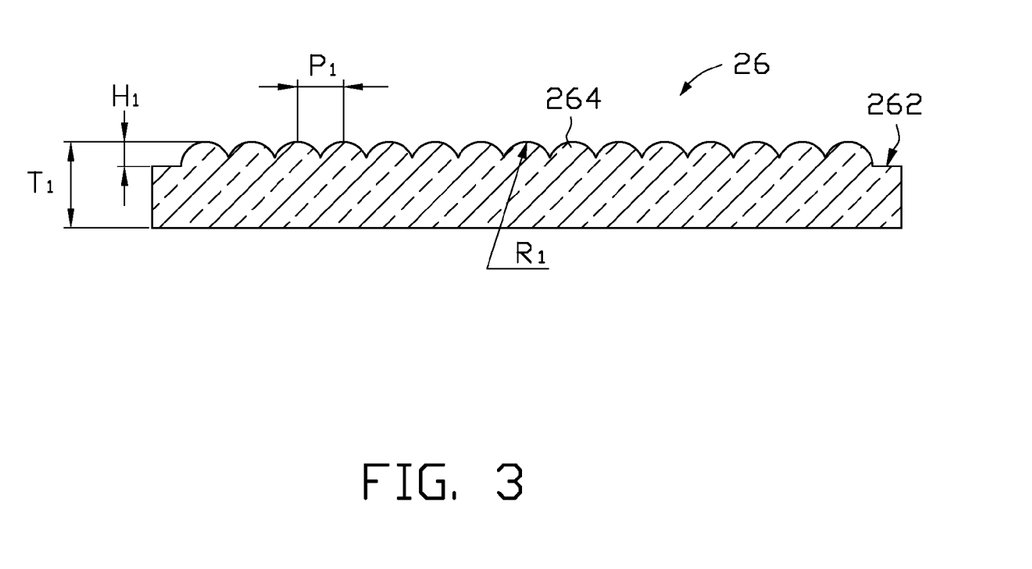
FIG. 3 is a side cross-sectional view of the first optical plate in FIG. 2, taken along line III-III.

Referring to FIG. 2 and FIG. 3, the first optical plate 26 has a light input surface 260 and an opposite light output surface 262. The light input surface 260 may be a flat surface adjacent to the LEDs 24. The light input surface 260 of the first optical plate 26 faces the LEDs 24 and the light output surface 262 of the first optical plate 26 faces away from the LEDs 24. Light enters the first optical plate 26 via the light input surface 260.

The light output surface 262 of the first optical plate 26 forms a plurality of elongated U-shaped protrusions 264 substantially parallel to one another. In one embodiment, a cross-section of the elongated arcuate protrusions 264 may be substantially semi-circular.

A pitch $P_1$ between adjacent elongated arcuate protrusions 264 is about 0.025 millimeters (mm) to about 1.5 mm. A radius $R_1$ of the elongated arcuate protrusions 264 is about $P_1/4$ to about $2P_1$. A maximum height $H_1$ of the elongated arcuate protrusions 264 is about 0.01 mm to about $R_1$. For example, if the pitch $P_1$ is 0.275 mm, the radius $R_1$ may be about 0.1375 mm, and maximum height $H_1$ may be about 0.11 mm.

In another embodiment, a cross-section of the elongated arcuate protrusions 264 may be a substantially semi-elliptical curve.

A thickness of the first optical plate 26 may be about 0.4 mm to about 4 mm. The first optical plate 26 may be made of a material such as polycarbonate, polymethyl methacrylate, polystyrene, copolymer of methyl methacrylate and styrene, and any suitable combination of those.

The first optical plate 26 may be integrally formed by injection molding technology, so that the first optical plate 26 has a stronger rigidity and mechanical strength. Thus, the first optical plate 26 has a relatively high reliability.

The structure and material of the second optical plate 28 may be the same as that of the first optical plate 26. When the first optical plate 26 and the second optical plate 28 are employed in the lighting device 200, an extending direction of the elongated arcuate protrusions 264 of the first optical plate 26 may be substantially perpendicular to an extending direction of a plurality of elongated arcuate protrusions of the second optical plate 28. A protecting plate to protect the second optical plate 28 is unnecessary because of the strong rigidity and mechanical strength of the elongated arcuate protrusions on the second optical plate 28.

In the illustrated embodiment, the first optical plate 26 and the second optical plate 28 are received in the housing 22. The first optical plate 26 and the second optical plate 28 may adhere to a sidewall of the housing 22, or be supported by a bracket.

The predetermined distance between the first optical plate 26 and the base of the housing 22, and the predetermined distance between the second optical plate 28 and the first optical plate 26 may be varied. In one embodiment, a depth of the housing 22 is inversely proportional to the number of the LEDs 24. For example, if the number of the LEDs 24 is large, the depth of the housing 22 is small, and the predetermined distance between the first optical plate 26 and the base of the housing 22, and the predetermined distance between the second optical plate 28 and the first optical plate 26 are short. If the number of the LEDs 24 is small, the depth of the housing 22 is large, and the predetermined distance between the first optical plate 26 and the base of the housing 22, and the predetermined distance between the second optical plate 28 and the first optical plate 26 are long.

Referring to FIG. 1 again, in use, light from the LEDs 24 diffuses in the first light-mixing space 31. When the light travels through the first optical plate 26, the light is refracted, reflected, and diffracted due to the plurality of elongated arcuate protrusions 264 on the light output surface 262 of the first optical plate 26. Thus, a relatively uniform surface light source is achieved.

After light travels through the first optical plate 26, light is diffused in the second light-mixing space 32. The light is refracted, reflected, and diffracted via the second optical plate 28. Therefore, in the lighting device 200, strong light spots of the light sources seldom occurs, and more uniform light is obtained.

In use, light emitted from the lighting device 200 is uniform to create a virtually single light source. When the lighting device 200 is used to illuminate an object, a single shadow of the object is formed. The first optical plate 26 and the second optical plate 28 may enhance the efficiency of light utilization and increase the brightness of the outputted light. The brightness of the lighting device 200 may increase by as much as 22 percent by using the first optical plate 26 and the second optical plate 28.

In an alternative embodiment, the lighting device 200 may further include at least one optical sheet positioned on the second optical plate 28. In such cases, the lighting device 200 may be used as a backlight module applied in a liquid crystal display. The optical sheet may be a diffusion sheet, a prism sheet, or a reflective polarizing sheet. The optical sheet may collimate an emitted light, thereby improving the brightness of light illumination and outputted light of the backlight module is uniform. The backlight module may also have a thin thickness.

Figure 4:
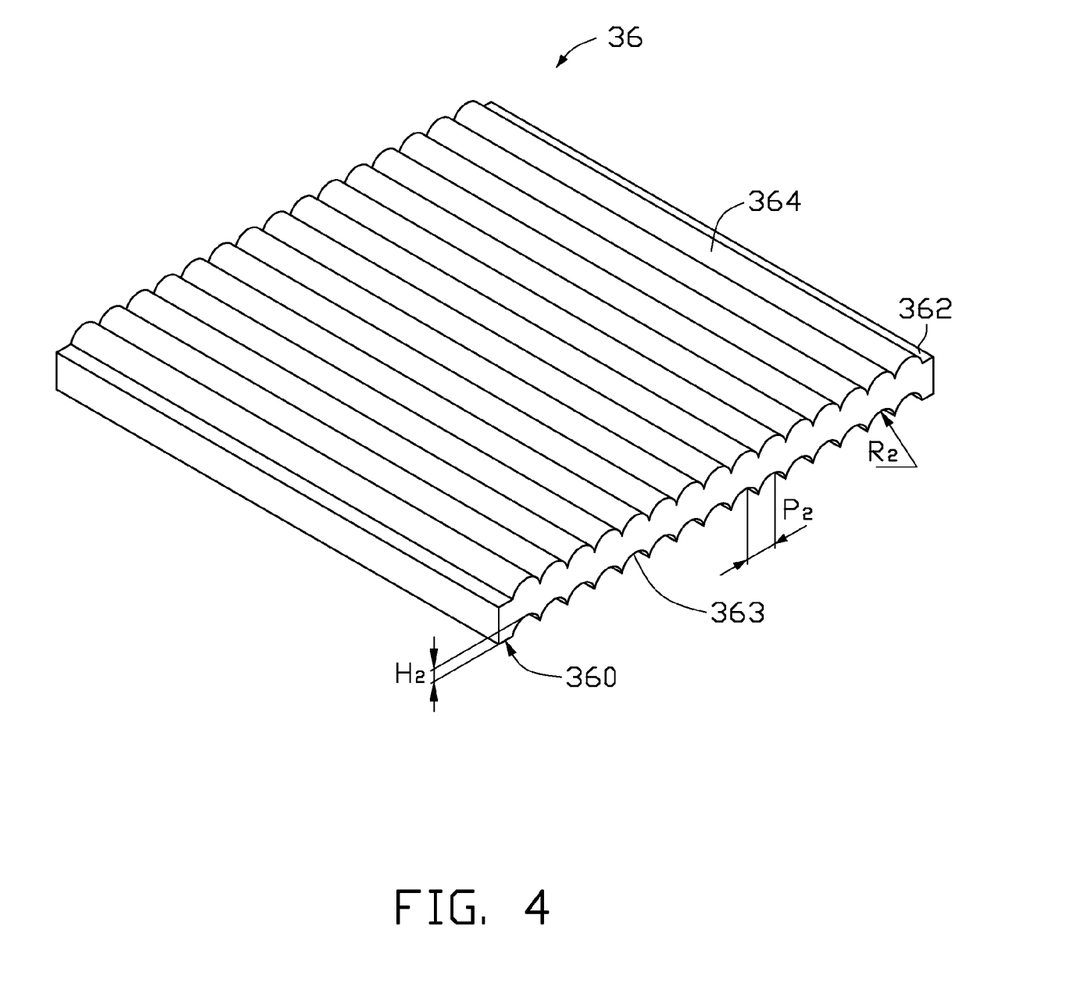
FIG. 4 is an isometric view of a second embodiment of a first optical plate.

Referring to FIG. 4, a second embodiment of a first optical plate 36 includes a light input surface 360 and an opposite light output surface 362. The first optical plate 36 is similar to the first optical plate 26, except that the light input surface 360 defines a plurality of elongated arcuate troughs 363 substantially parallel to one another. An extending direction of the elongated arcuate troughs 363 is substantially parallel to an extending direction of a plurality of elongated arcuate protrusions 364 formed on the light output surface 362.

A cross-section of the elongated arcuate troughs 363 is substantially semi-circular. A pitch $P_2$ between adjacent elongated arcuate troughs 363 is about 0.025 mm to about 1 mm. A radius $R_2$ of the elongated arcuate troughs 363 is about 0.006 mm to about 2 mm. A maximum depth $H_2$ of the elongated arcuate troughs 363 is about 0.01 mm to about 2 mm. In an embodiment, a cross-section of the elongated arcuate troughs 363 may be a substantially semi-elliptical curve.

Figure 5:
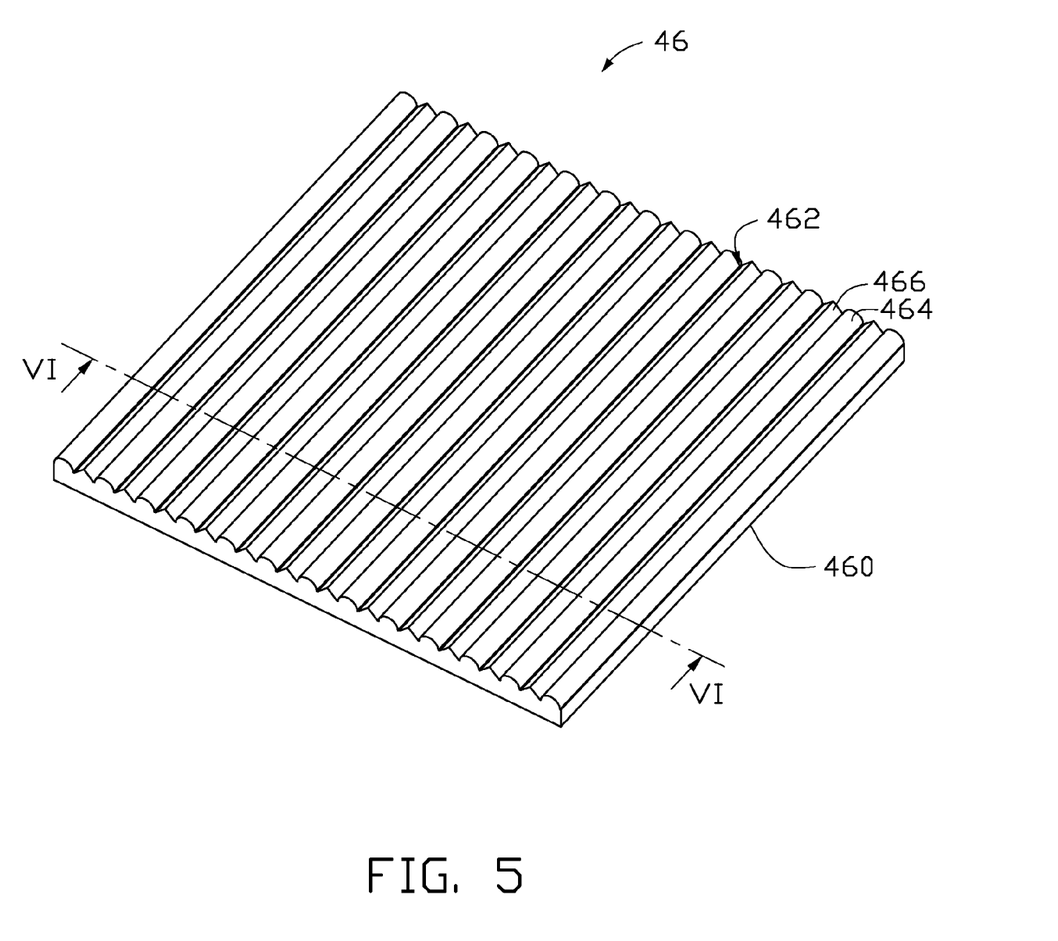
FIG. 5 is an isometric view of a third embodiment of a first optical plate.
Figure 6:
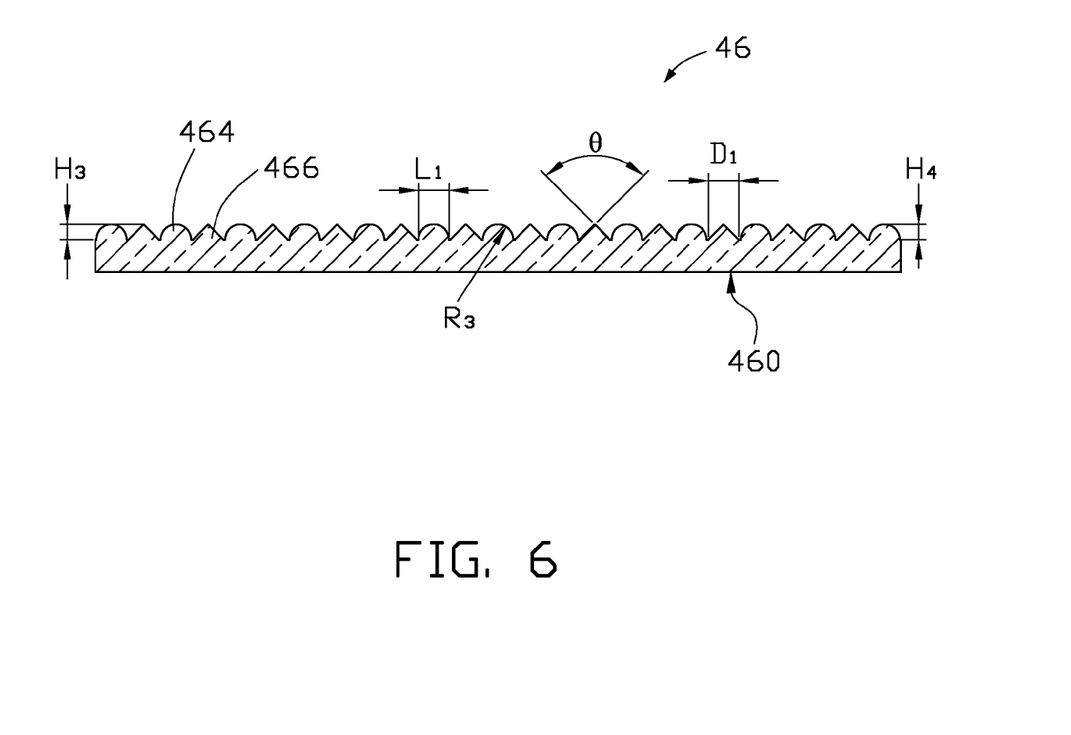
FIG. 6 is a side cross-sectional view of the first optical plate in FIG. 5, taken along line VI-VI.

Referring to FIGS. 5 and 6, a third embodiment of first optical plate 46 includes a light input surface 460 and an opposite light output surface 462. The first optical plate 46 is similar to the first optical plate 26, except that a plurality of elongated arcuate protrusions 464 and a plurality of V-shaped ridges 466 are alternately formed on the light output surface 462. The elongated arcuate protrusions 464 and the V-shaped ridges 466 are substantially parallel to one another.

A cross-section of the elongated arcuate protrusions 464 may be semi-circular. A maximum width D1 of the V-shaped ridges 466 is about 0.025 mm to about 1 mm. A vertex angle θ of the V-shaped ridges 466 is about 80 degrees to about 100 degrees. A maximum height $H_3$ of the V-shaped ridges 466 is about 0.01 mm to about 3 mm.

A width $L_1$ of the elongated arcuate protrusions 464 is about 0.025 mm to about 1.5 mm. A radius $R_3$ of the elongated arcuate protrusions 464 is about $L_1/4$ to about $L_1$. A maximum height $H_4$ of the elongated arcuate protrusions 464 is about 0.01 mm to about $R_3$. The maximum width $D_1$, the vertex angle θ, the maximum height $H_3$, the width $L_1$, the radius $R_3$, and the maximum height $H_4$, thereby adjusting the brightness of outputted light travelling through the first optical plate 46.

Figure 7:
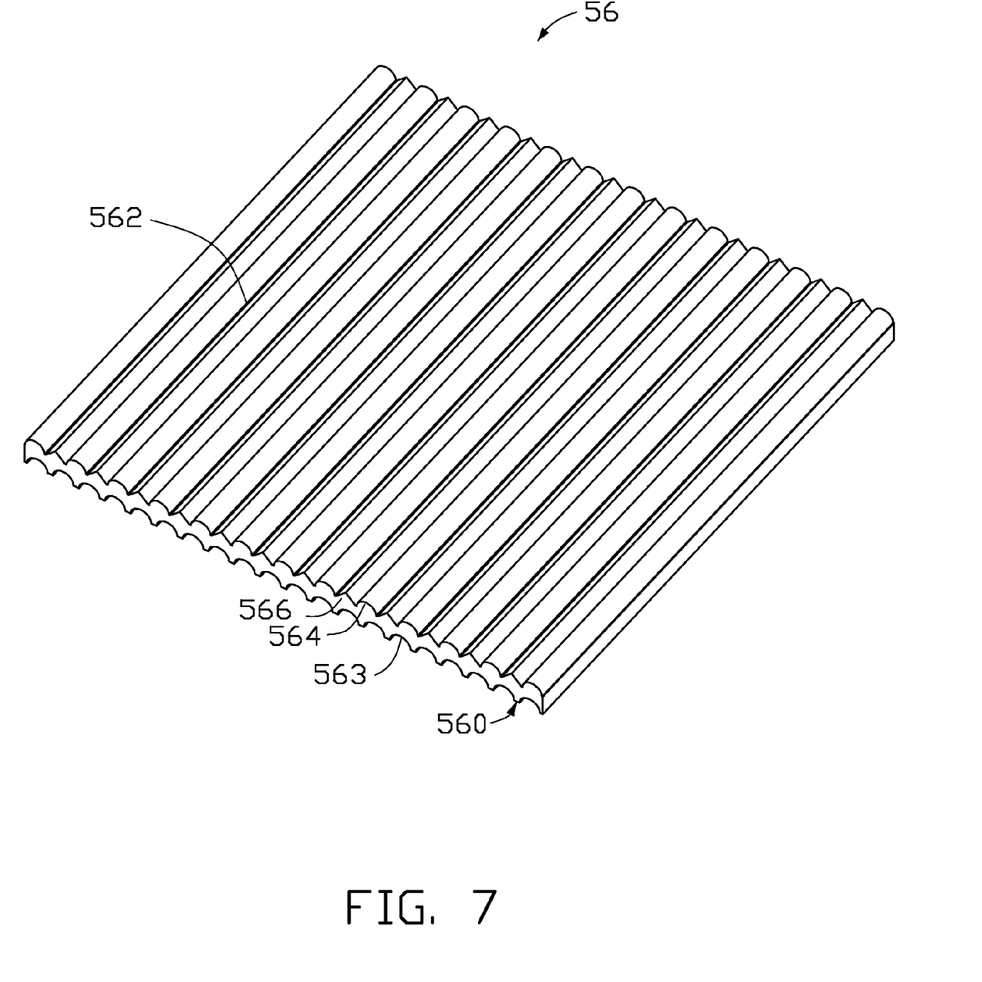
FIG. 7 is an isometric view of a fourth embodiment of a first optical plate.

Referring to FIG. 7, a fourth embodiment of a first optical plate 56 includes a light input surface 560 and an opposite light output surface 562. The first optical plate 56 is similar to the first optical plate 46, except that the light input surface 560 defines a plurality of elongated arcuate troughs 563. An extending direction of the elongated arcuate troughs 563 is substantially parallel to an extending direction of a plurality of elongated arcuate protrusions 564 and a plurality of V-shaped ridges 566 of the light output surface 562.

Figure 8:
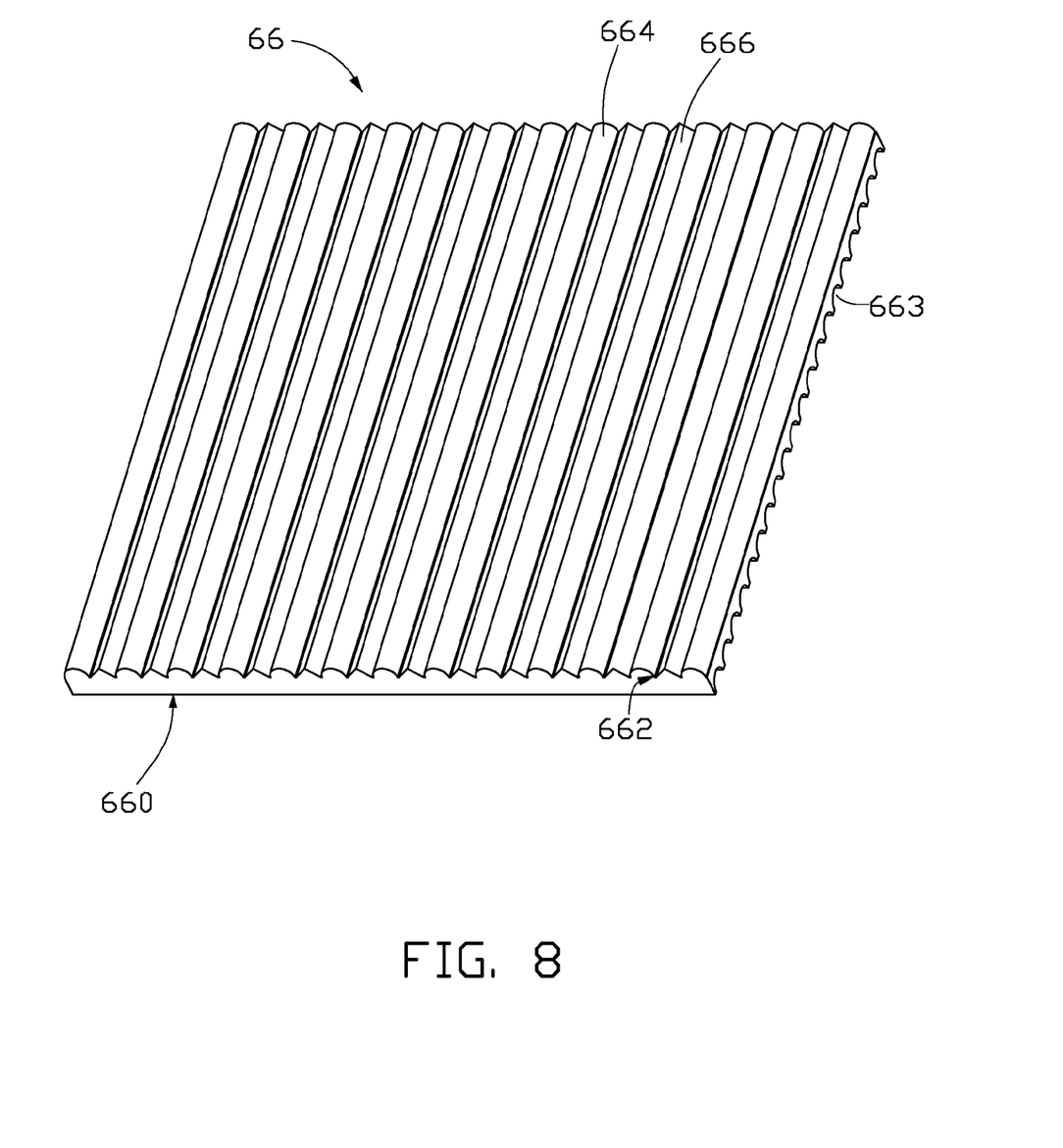
FIG. 8 is an isometric view of a fifth embodiment of a first optical plate.

Referring to FIG. 8, a fifth embodiment of a first optical plate 66 includes a light input surface 660 and an opposite light output surface 662. The first optical plate 66 is similar to the first optical plate 56, except that an extending direction of a plurality of elongated arcuate troughs 663 in the light input surface 660 is substantially perpendicular to an extending direction of a plurality of elongated arcuate protrusions 664 and a plurality of V-shaped ridges 666 of the light output surface 662.

Figure 9:
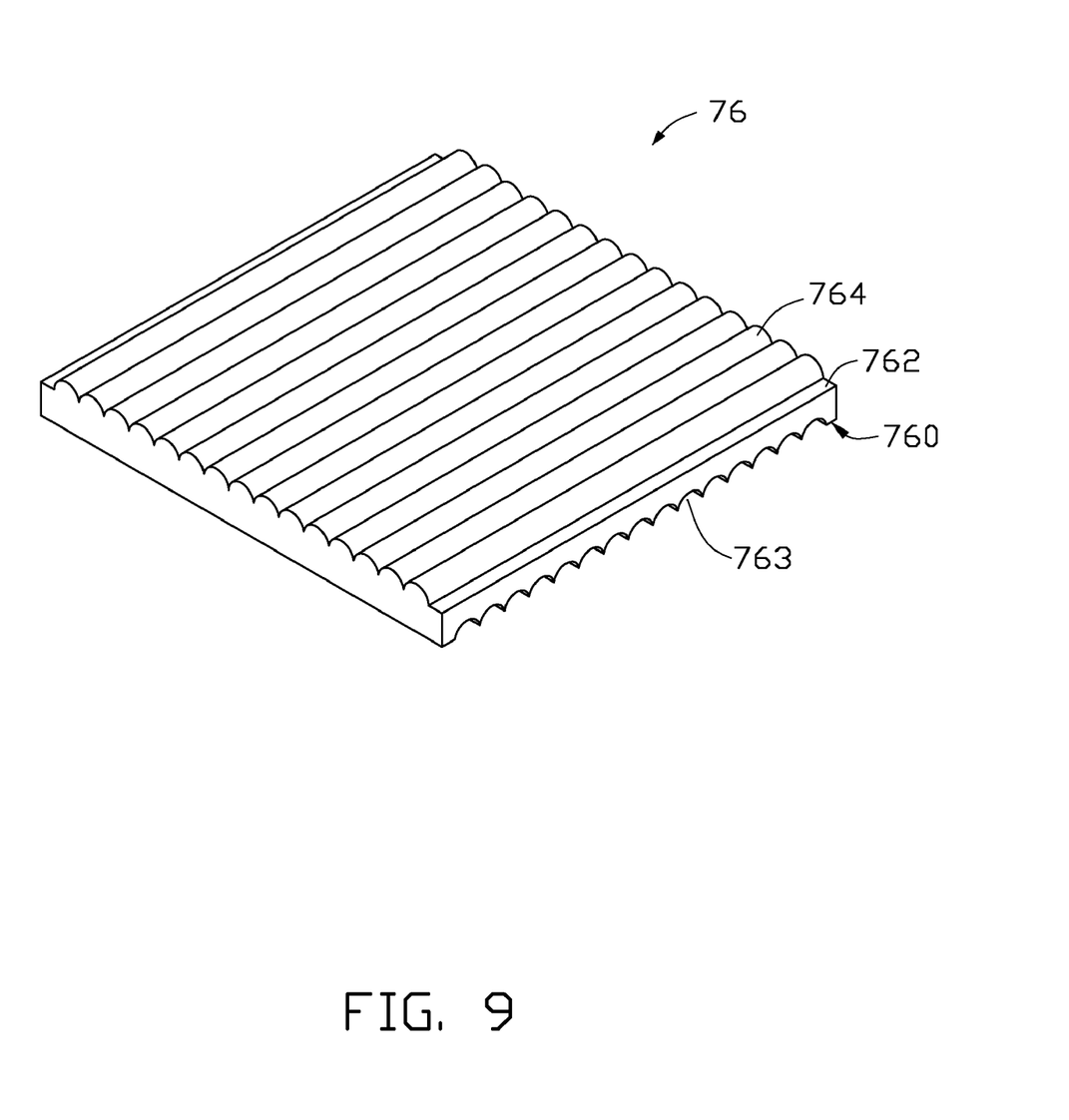
FIG. 9 is an isometric view of a sixth embodiment of a first optical plate.

Referring to FIG. 9, a sixth embodiment of a first optical plate 76 is similar to the first optical plate 26, except that a light input surface 760 of the first optical plate 76 defines a plurality of elongated arcuate troughs 763. An extending direction of the elongated arcuate troughs 763 is substantially perpendicular to an extending direction of a plurality of elongated arcuate protrusions 764 of a light output surface 762.

Figure 10:
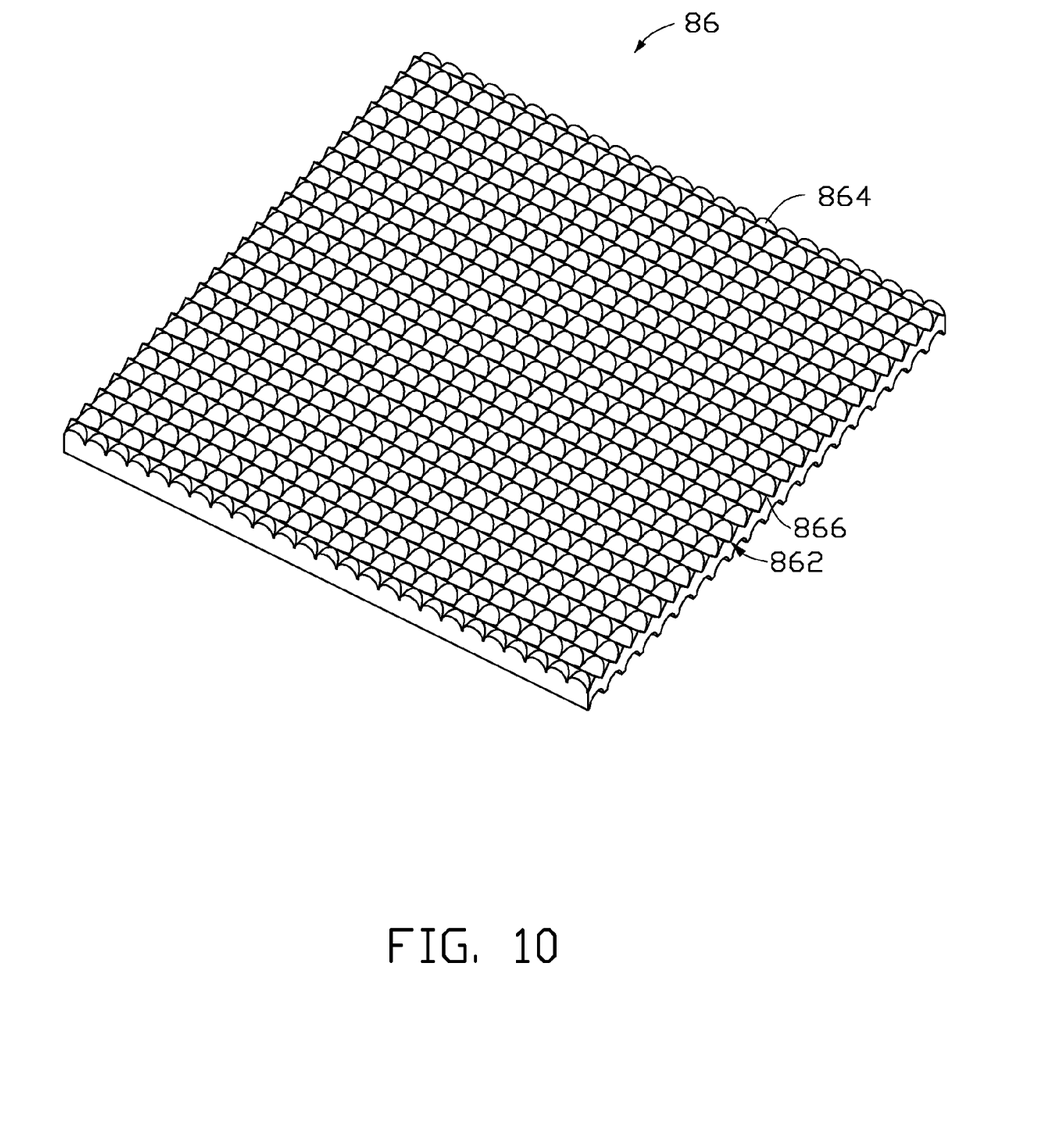
FIG. 10 is an isometric view of a seventh embodiment of a first optical plate.

Referring to FIG. 10, a seventh embodiment of a first optical plate 86 is similar to the first optical plate 76, except that a light output surface 862 further forms a plurality of V-shaped ridges 866. The V-shaped ridges 866 substantially perpendicularly intersect with a plurality of elongated arcuate protrusions 864 of the light output surface 862.

The structure of the second optical plate 28 of the lighting device 200 may be the same as that of the first optical plates 26, 36, 46, 56, 66, 76, 86.

It may be appreciated that in the lighting device, the structure of the first optical plate may be different from that of the second optical plate. For example, when the first embodiment of the first optical plate 26 is used in the lighting device 200, the structure of the second optical plate 28 may be the same as that of the second embodiment of the first optical plate 36. Alternatively, the second optical plate 28 may be omitted.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A lighting device comprising:
   a housing;
   a plurality of LEDs arranged in the housing;

a first optical plate positioned above the LEDs, the first optical plate comprising:
a light input surface;
a light output surface opposite to the light input surface; and
a plurality of elongated arcuate protrusions formed on the light output surface, the elongated arcuate protrusions being substantially parallel to one another; and
a second optical plate positioned above the first optical plate, the second optical plate comprising a light input surface, a light output surface opposite to the light input surface, a plurality of V-shaped ridges and a plurality of elongated arcuate protrusions, wherein the V-shaped ridges and the elongated arcuate protrusions are formed on the light output surface of the second optical plate, and the V-shaped ridges substantially perpendicularly intersect with the elongated arcuate protrusions of the second optical plate.

2. The lighting device of claim 1, wherein an extending direction of the elongated arcuate protrusions of the second optical plate is substantially perpendicular to an extending direction of the elongated arcuate protrusions of the first optical plate.

3. The lighting device of claim 1, wherein the first optical plate further defines a plurality of elongated arcuate troughs in the light input surface; an extending direction of the elongated arcuate troughs is substantially perpendicular to an extending direction of the elongated arcuate protrusions of the first optical plate.

4. The lighting device of claim 1, wherein a plurality of V-shaped ridges are formed on the light output surface, the V-shaped ridges and the elongated arcuate protrusions of the first optical plate are substantially parallel to one another and alternately formed on the light output surface of the first optical plate.

5. The lighting device of claim 4, wherein the first optical plate further defines a plurality of elongated arcuate troughs in the light input surface; an extending direction of the elongated arcuate troughs of the light input surface is substantially parallel to an extending direction of the V-shaped ridges and the elongated arcuate protrusions of the light output surface of the first optical plate.

6. The lighting device of claim 4, wherein the first optical plate further defines a plurality of elongated arcuate troughs in the light input surface; an extending direction of the elongated arcuate troughs of the light input surface of the first optical plate is substantially perpendicular to an extending direction of the V-shaped ridges and the elongated arcuate protrusions of the light output surface of the first optical plate.

7. The lighting device of claim 1, wherein the first optical plate defines a plurality of elongated arcuate troughs defined in the light input surface; an extending direction of the elongated arcuate troughs of the light input surface is substantially perpendicular to an extending direction of the elongated arcuate protrusions of the light output surface of the first optical plate.

8. The lighting device of claim 1, further comprising a plurality of V-shaped ridges formed on the light output surface of the first optical plate, the V-shaped ridges substantially perpendicularly intersect with the elongated arcuate protrusions of the light output surface of the first optical plate; the light input surface of the first optical plate defines a plurality of elongated arcuate troughs, an extending direction of the elongated arcuate troughs is substantially parallel to an extending direction of the V-shaped ridges of the first optical plate.

9. The lighting device of claim 1, wherein the second optical plate further defines a plurality of elongated arcuate troughs in the light input surface; an extending direction of the elongated arcuate troughs of the second optical plate is substantially perpendicular to an extending direction of the elongated arcuate protrusions of the second optical plate.

10. The lighting device of claim 1, wherein the first optical plate and the second optical plate are made of a material selected from the group consisting of polycarbonate, polymethyl methacrylate, polystyrene, copolymer of methyl methacrylate and styrene, and any suitable combination of those.

11. The lighting device of claim 1, wherein a cross-section of the elongated arcuate protrusions of the first optical plate is semi-circular or a semi-elliptical curve.

12. A lighting device used as a backlight module comprising:
a housing;
a plurality of LEDs arranged in the housing;
a first optical plate positioned above the LEDs;
a second optical plate disposed above the first optical plate, wherein the first optical plate and the second optical plate each comprise a light input surface, a light output surface opposite to the light input surface, and a plurality of elongated arcuate protrusions formed on the light output surface; the elongated arcuate protrusions are substantially parallel to one another; an extending direction of the elongated arcuate protrusions of the first optical plate is substantially perpendicular to an extending direction of the elongated arcuate protrusions of the second optical plate; and
wherein the second optical plate further comprises a plurality of V-shaped ridges formed on the light output surface, and the V-shaped ridges substantially perpendicularly intersect with the elongated arcuate protrusions of the second optical plate.

13. The lighting device of claim 12, further comprising at least one optical sheet positioned on the second optical plate.

14. The lighting device of claim 12, wherein the first optical plate is arranged on a base of the housing, and spaced from the base of the housing at a predetermined distance; the first optical plate and the housing cooperatively define a first light-mixing space.

15. The lighting device of claim 12, wherein the second optical plate is spaced from the first optical plate at a predetermined distance; a second light-mixing space is defined between the first optical plate and the second optical plate.

* * * * *